US005394171A

United States Patent [19]

Rabii

[11] Patent Number: 5,394,171

[45] Date of Patent: Feb. 28, 1995

[54] SYNCHRONIZING SIGNAL FRONT END PROCESSOR FOR VIDEO MONITOR

[75] Inventor: Khosro M. Rabii, Arlington Heights, Ill.

[73] Assignee: Zenith Electronics Corp., Glenview, Ill.

[21] Appl. No.: 969,908

[22] Filed: Nov. 2, 1992

[51] Int. Cl.[6] .................................................. H04N 5/04

[52] U.S. Cl. ..................................... 345/213; 348/500; 348/525; 348/558

[58] Field of Search ........................ 340/814, 717, 799; 358/148, 158, 149, 152; 345/213, 185, 3; H04N 5/04, 5/05, 5/06; 348/510, 511, 500, 525, 495, 558

[56] References Cited

U.S. PATENT DOCUMENTS

| | | | |
|---|---|---|---|
| 4,665,495 | 5/1987 | Thaden | 345/185 |
| 4,837,621 | 6/1989 | Yug | 358/148 |
| 5,111,190 | 5/1992 | Zenda | 340/814 |
| 5,134,481 | 6/1992 | Gorrati et al. | 358/148 |
| 5,155,595 | 10/1992 | Robison | 358/149 |
| 5,212,552 | 5/1993 | Matsumoto | 358/158 |

*Primary Examiner*—Alvin E. Oberley
*Assistant Examiner*—Kara Farnandez

[57] ABSTRACT

A synchronizing signal front end processor for video monitors includes a synchronizing signal subprocessor which responds to computer generated horizontal and vertical rate scan signals to provide alternative scan signal coupling in the event of interruption or abnormalities of the applied scan signals. The processor also includes horizontal and vertical synchronizing signal subprocessors which produce output signals indicative of the polarity and frequency of the applied selected scan synchronizing signals. In addition, the vertical and horizontal sync subprocessors provide respective sync out of range signals during sync interruption or abnormality which are utilized to stabilize the monitor display scanning process while switching to alternative scan synchronizing signal sources. The horizontal and vertical sync subprocessors each utilize a counter controlled by an edge detection system to accumulate clock signal count numbers indicative of the positive and negative portions of the applied scan synchronizing signals. These counts are utilized for polarity decoding and frequency decoding within the system.

22 Claims, 7 Drawing Sheets

SYNCHRONIZING SIGNAL FRONT END PROCESSOR FOR VIDEO MONITOR

FIELD OF THE INVENTION

This invention relates generally to computer video monitors and particularly to circuits for processing synchronizing signals applied to the monitor by a computer.

BACKGROUND OF THE INVENTION

Video monitors used in computer display systems provide an output device such as a cathode ray tube or diode display matrix which are horizontally and vertically scanned in a raster pattern similar to that utilized in television receivers. The to-be-displayed information is coupled to the display in synchronism with the scanning process. In cathode ray tubes, for example, the electron beams within the cathode ray tube are intensity modulated with the to-be-displayed video signals in synchronism with the beam scanning process.

In most computer display systems, the computer develops horizontal and vertical scan synchronizing signals which are appropriately related to the to-be-displayed information. Within the video monitor, horizontal and vertical scanning systems respond to and are controlled by these synchronizing signals.

In many video monitors, additional information beyond scanning system synchronization may be communicated between the computer and the video monitor using the scan synchronizing signals. In such systems, the computer produces a set of horizontal and vertical scan synchronizing signals having signal frequencies and polarities established in a selected combination which identifies and communicates certain display system information. Within the video monitor, a so-called front end processor utilizes the horizontal and vertical scan synchronizing information to establish monitor display mode (for example, number of pixels per line, number of lines per frame, etc.). In addition, the front end processor also affects certain display system adjustments such as display size and horizontal and vertical centering.

In order to reliably communicate such information using synchronizing signal polarities and frequencies, the computer applies a predetermined combination of synchronizing signal polarities and frequencies to the video monitor. Within the video monitor, the front end processor "decodes" the relevant information and processes it to implement corresponding display mode characteristics and operation. The proper function of such video monitor systems requires that the display mode and adjustment information be accurately recovered while the integrity of the synchronizing signals is maintained to avoid interfering with the basic scan synchronizing process. As a result, the systems heretofore provided within video display monitors for recovering such information have often become excessively complex and costly. In addition, display system performance has, in some instances, been compromised.

It is an object, therefore, of the present invention to provide an improved video monitor. It is a more particular object of the present invention to provide an improved synchronizing signal front end processor for use in a video monitor.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
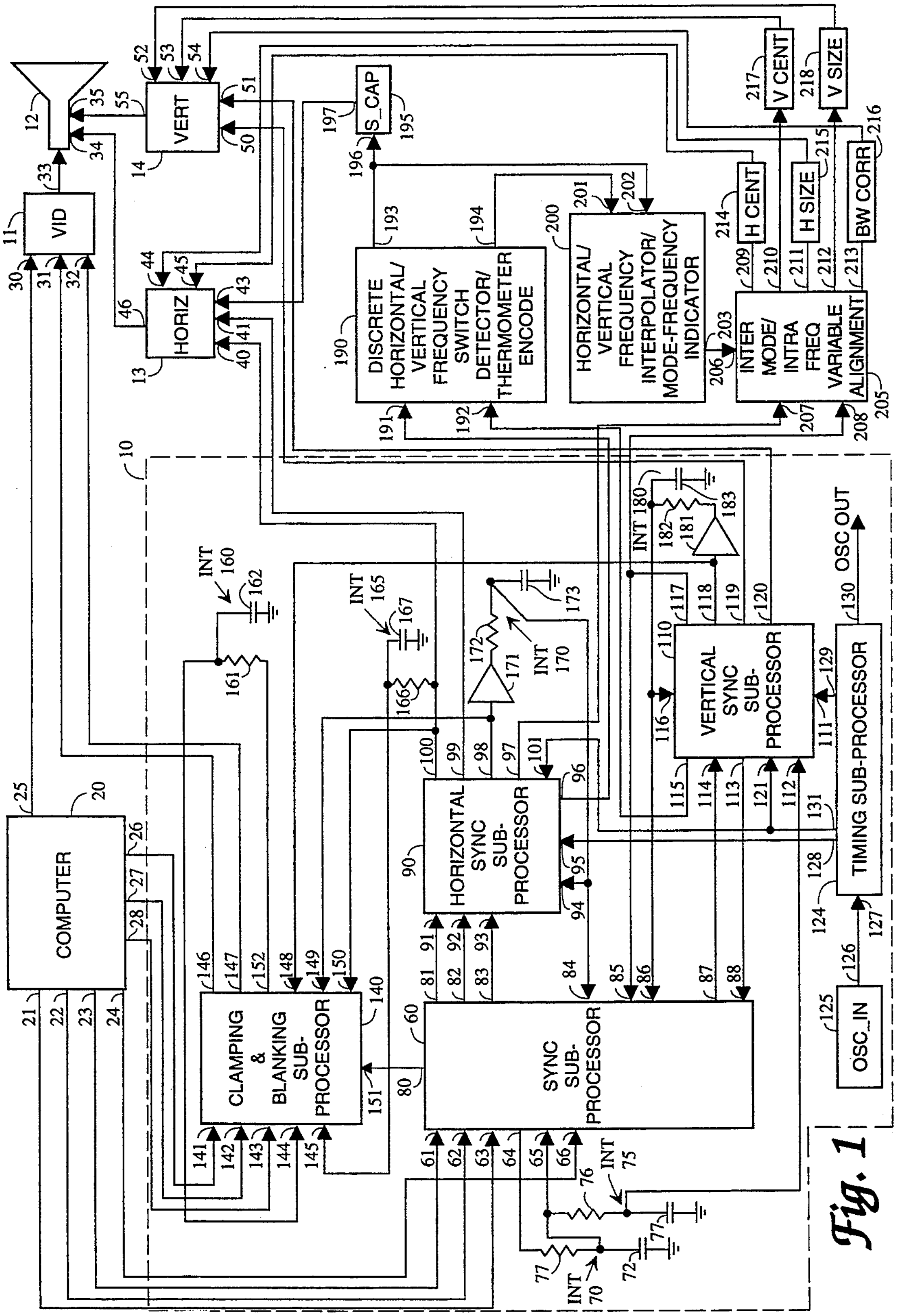
FIG. 1 sets forth a block diagram of a synchronizing signal front end processor and typical video monitor constructed in accordance with the present invention.

FIG. 1 sets forth a block diagram of a synchronizing signal front end processor and video monitor constructed in accordance with the present invention.

By way of overview, the diagram of FIG. 1 shows a synchronizing signal front end processor generally referenced by numeral 10 which is constructed in accordance with the present invention and described below in greater detail. Also shown in FIG. 1 is a generalized diagram of a conventional computer 20 having a video processor 11 and cathode ray tube display 12 together with horizontal and vertical scanning systems 13 and 14 all constructed in accordance with conventional fabrication techniques. FIG. 1 also shows a conventional synchronizing signal decoding system comprising system elements 190, 200 and 205 which receive the output signals of processor 10 and utilize cooperating digital to analog converting elements to produce corresponding control signals and voltages for use by horizontal and vertical systems 13 and 14. System elements 190, 200 and 205 are also constructed in accordance with conventional fabrication techniques.

Processor 10 receives the synchronizing and blanking signals from computer 20 which have been formatted by computer 20 to provide the display mode and frequency information intended to properly configure the remainder of the monitor display system. In essence, processor 10 by means set forth below in greater detail "decodes" the synchronizing signals and thereafter properly configures the synchronizing signals for use by horizontal and vertical scan systems 13 and 14 while also providing digitally encoded output signals having the display mode and scan frequency encoded information for use in performing functions such as horizontal and vertical centering and size of the display as well as certain geometric corrections. Thus, with the recognition that the system elements of FIG. 1 surrounding processor 10 may be fabricated in accordance with conventional fabrication techniques, detailed descriptions thereof are not believed necessary and the descriptions that follow will focus on the inventive structure of processor 10.

Specifically, a computer 20 includes a vertical sync output 21, a horizontal sync output 22 and a composite sync output 23 coupled to inputs 63, 62 and 61 respectively of sync subprocessor 60 within processor 10. Computer 20 also includes a vertical blanking output 26, a vertical oscillator output 27 and a horizontal blanking output 28 coupled to inputs 141, 142 and 143 respectively of subprocessor 140 within processor 10. Computer 20 further includes a mode signal output 24 coupled to input 66 of subprocessor 60 and an output 25 coupled to a video input 30 of video processor 11. Video processor 11 further includes a clamping signal input 31 and a blanking signal input 32 coupled to outputs 146 and 147 respectively of subprocessor 140. Video processor 11 includes a video output 33 coupled to a cathode ray tube 12. A horizontal scan system 13 includes a horizontal sync input 40 and a horizontal frequency signal input 41 coupled to outputs 100 and 99 respectively of subprocessor 90 within front end processor 10. Horizontal scan system 13 further includes an input 43 coupled to an S-shaping capacitor bank 195 and a scan signal output 46 coupled to input 34 of cathode ray tube 12. Horizontal scan system 13 further includes a horizontal size input 44 and a horizontal centering input 45 coupled to horizontal size matrix 215 and horizontal centering matrix 214 respectively.

Vertical scan system 14 includes a vertical sync input 50 and a vertical frequency signal input 51 coupled to outputs 119 and 120 of subprocessor 110 within front end processor 10. Vertical scan system 14 further includes a vertical size input 52, a vertical centering input 53 and a pin cushion correction input 54 coupled to vertical centering matrix 217, vertical size matrix 218 and pin cushion correction matrix 216 respectively. Vertical scan system 14 further includes a scan signal output 55 coupled to vertical scan input 35 of cathode ray tube 12. It should be understood that cathode ray tube 12 includes conventional horizontal and vertical deflection apparatus for scanning the cathode ray tube in response to the applied horizontal and vertical scan signals.

System element 190 includes a horizontal count input 191 and a vertical count input 192 coupled to outputs 96 and 115 of subprocessors 90 and 110 respectively. System element 190 further includes a pair of outputs 193 and 194 coupled to inputs 202 and 201 respectively of a system element 200. An S-shaping capacitor matrix 195 includes an input 196 coupled to output 193. System element 200 includes an output 203 coupled to input 206 of system output 205. System output 205 further includes a horizontal polarity input 207 and a vertical polarity input 208 coupled respectively to output 97 of subprocessor 90 and output 117 of subprocessor 110. System element 205 includes a horizontal centering output 209 coupled to matrix 214, a vertical centering output 210 coupled to matrix 217, a horizontal size output 211 coupled to matrix 215, a vertical size output 212 coupled to matrix 218 and an East-West pin cushion correction output 213 coupled to matrix 217. Matrices 214 through 218 are coupled to horizontal scan 13 and vertical scan 14 in the manner described above.

Synchronizing signal front end processor 10 includes a sync signal subprocessor 60 having inputs 61, 62 and 63 receiving composite sync, horizontal sync, and vertical sync from computer 20. Subprocessor 60 further includes a selected sync signal output 64 coupled to an integrator 70 comprising a series resistor 71 and a parallel capacitor 72. The output of integrator 70 is coupled to an integrated horizontal sync signal input 65 of processor 60. The output of integrator 70 is further coupled to a second integrator 75 formed of a series resistor 76 and a parallel capacitor 77. A mode selection signal input 66 of processor 60 is coupled to computer 20. A composite sync selection signal output 80 is coupled to an input 151 of subprocessor 140. Subprocessor 60 further includes a vertical interrupt signal input 88 coupled to output 113 of subprocessor 110, an integrated vertical sync output 87 coupled to input 114 of processor 110, a vertical sync polarity input 85 coupled to output 117 of processor 110 and an integrated vertical sync out of range signal input 86 coupled to integrator 180. Processor 60 further includes an integrated horizontal sync out of range signal input 84 coupled to integrator 170 and a horizontal sync interruption signal input 83 coupled to output 93 of subprocessor 90 together with a selected horizontal sync output 81 and a horizontal hold signal output 82 coupled to inputs 91 and 92 respectively of subprocessor 90.

Vertical sync subprocessor 110 includes an input 112 coupled to integrator 75, a clock input 111, and an integrated vertical sync out of range input 116 coupled to integrator 180. Subprocessor 110 further includes a vertical sync out of range output 118 coupled to buffer 181, a normalized vertical sync output 119 coupled to input 50 of vertical scan system 14, and a vertical frequency number output 120 coupled to input 51 of vertical scan system 14. Subprocessor 110 also includes an output 117 producing a vertical sync polarity signal which is coupled to input 85 of subprocessor 60. Buffer 181 is coupled to an integrator 180 formed by a series resistor 182 and a parallel capacitor 183.

A horizontal sync signal subprocessor 90 includes inputs 91, 92 and 93 coupled to subprocessor 60 as described above. Subprocessor 90 further includes a normalized sync output 100 coupled to input 150 of processor 140 and to integrator 165. Integrator 165 is formed of a series resistor 166 and a parallel capacitor 167. The output of integrator 165 is coupled to integrated horizontal sync input 145 of processor 140. Subprocessor 90 further includes a horizontal frequency number output 99 coupled to horizontal scan system 13, a horizontal sync out of range signal output 98 coupled to input 149 of subprocessor 140 and to a buffer 171. The output of buffer 171 is coupled to an integrator 170 formed by a series resistor 172 and a parallel capacitor 173. The output of integrator 170 is coupled to input 94 of subprocessor 90. Subprocessor 90 also includes a horizontal sync polarity signal output 97 coupled to input 207 of system element 205.

A clamping and blanking signal subprocessor 140 includes a vertical blanking input 141, a vertical oscillator input 142, and a horizontal blanking input 143 coupled to output 26, 27 and 28 respectively of computer 20. Subprocessor 140 further includes an integrated screen blanking signal input 144 coupled to the output of integrator 160. Subprocessor 140 also includes an integrated normalized horizontal sync signal input 145 coupled to integrator 165. Subprocessor 140 includes a clamping signal output 146 and a blanking signal output 147 coupled to video processor 11 as described above. Subprocessor 140 also includes a screen blanking signal output 152 coupled to an integrator 160 formed of a series resistor 161 and a parallel capacitor 162. Subprocessor 140 includes inputs 148, 149 and 150 coupled to subprocessor 110 and subprocessor 90 as described above.

An oscillator 125 produces 6.31 megahertz output signal at output 126 which is coupled to an input 127 of a timing subprocessor 124. Subprocessor 124 includes a divide by 512 frequency divider, an oscillator output 130, a horizontal clock signal output 128 coupled to input 95 of subprocessor 90, and a vertical clock output 129 coupled to clock input 111 of subprocessor 110. Subprocessor 124 further includes an output 131 which couples the least significant eight bits of its frequency divider to inputs 101 and 121 of subprocessors 90 and 110 respectively.

In operation, synchronizing signal subprocessor 60 receives composite horizontal and vertical synchronizing signals at input 61 from computer 20 as well as individual horizontal and vertical synchronizing signals at inputs 62 and 63. By means set forth below in greater detail, subprocessor 60 operates to select from the synchronizing signal inputs and provide a selected horizontal sync to horizontal subprocessor 90 at output 81 and a selected vertical sync at output 65. The selected vertical sync signal is integrated a first time by integrator 70 to produce an integrated vertical sync signal which is reapplied to sync subprocessor 60. The integrated vertical sync signal is integrated a second time by integrator 75 and coupled to vertical sync subprocessor 110. In addition, computer 20 may provide a mode selection signal which overrides the sync selection automatically processed by subprocessor 60 by applying a mode select signal to input 66. The integrated vertical sync signal from integrator 70 is also coupled directly to vertical sync subprocessor 110. In addition, to sync selection, subprocessor 60 also may receive output signals from horizontal sync subprocessor 90 and vertical sync subprocessor 110 which in the manner described below are produced in the event the horizontal or vertical scan synchronizing signals are outside a predetermined frequency range. These out of range indicating signals are used by subprocessor 60 to select alternative synchronizing signal inputs from among the available sync signals at inputs 61 through 63 until a synchronizing signal within the predetermined range can be found. In addition, subprocessor 60 is operative in the event the composite vertical and horizontal synchronizing signals at input 61 are selected to interrupt the operation of horizontal sync subprocessor 90 during the vertical synchronizing signal interval by producing a horizontal hold output signal at output 82 which is applied to input 92 of horizontal sync processor 90.

Horizontal sync subprocessor 90 is described below in FIG. 3 in greater detail and is operative to receive the selected horizontal sync signal from subprocessor 60 and produce a horizontal sync polarity signal which is provided to system element 205 and forms a portion of the encoded information described above. In addition, subprocessor 90 compares the sync signal polarity to the correct polarity required by the scan synchronizing systems within horizontal scan system 13 and provides a polarity correction if necessary to normalize the horizontal scan synchronizing signals and thereby maintain proper scan system operation.

To further decode information from the horizontal scan synchronizing signal, subprocessor 90 also detects the scan signal frequency and produces an output frequency indicating number as well as an output voltage related directly to the horizontal scan frequency. In addition, horizontal sync subprocessor 90 includes an inhibiting system which responds to the horizontal hold signal at input 92 from subprocessor 60 to interrupt the operation of subprocessor 90 during the vertical sync interval in the event the composite sync signal is being processed. Subprocessor 90 also operates to produce an out of range signal indicating the above-mentioned frequency variation of the horizontal sync signal beyond the predetermined sync range. This out of range signal is accompanied by an interrupt signal at output 93 which is coupled to subprocessor 60 to cause a temporary interruption of sync signal processing. At the same time, the out of range signal is integrated by integrator 170 to provide noise immunity and avoid system response to short duration transient type signals. The integrated out of range signal is then applied to subprocessor 60 to produce the above-mentioned switching of horizontal sync signal input selection. Horizontal sync subprocessor 90 also produces a numeric output signal indicative of the number of clock signals occurring during the horizontal sync signal period which is applied to system element 190 and utilized as display mode and display adjustment input information described above.

Vertical sync subprocessor 110 is described below in FIG. 4 in greater detail and is operative to receive the integrated vertical sync signal from integrator 70 through subprocessor 60 and to receive the twice integrated vertical sync signal from integrator 75 at inputs 114 and 112 respectively. Subprocessor 110 operates upon the vertical sync signal in much the same way as horizontal sync subprocessor 90 operates upon the horizontal sync signal and produces a generally corresponding group of vertical sync output signals. The operation of vertical sync subprocessor 110 differs from that of horizontal sync subprocessor 90 in that the circuitry necessary to interrupt processing during vertical synchronizing signals when composite sync is being processed is, of course, not required in the vertical sync processor. Thus, subprocessor 110 detects the frequency and polarity of the vertical sync signal and produces a numeric count output at output 115 indicative of the vertical scan period which is coupled to input 192 of system element 90 as well as a vertical sync polarity signal at output 117 which is coupled to system element 205. Subprocessor 110 also produces a voltage output signal at output 120 which is directly indicative of the vertical sync signal frequency and which is applied to vertical scan system 14. In addition to determining the polarity of vertical scan sync signal, subprocessor 110 compares this polarity to the appropriate polarity for processing by vertical scan system 14 and corrects or normalizes the vertical sync signal polarity if necessary to produce a normalized vertical sync signal for use by vertical scan system 14. In further similarity of subprocessor 90, subprocessor 110 also operates to produce an out of range signal in the event the vertical sync frequency is outside a predetermined frequency range. This vertical sync out of range signal is coupled by buffer 181 to integrator 180. The integration of the vertical sync out of range signal provides noise immunity. The integrated signal is then coupled to subprocessor 110 and subprocessor 60.

Clamping and blanking subprocessor 140 operates in the manner set forth below in FIG. 5 to provide video clamping and blanking signals for video processor 11. Subprocessor 140 functions to select clamping and blanking signals from the plurality of alternative signals provided to subprocessor 140. In addition, subprocessor 140 responds to the above-described out of range signals from horizontal sync subprocessor 90 and vertical sync subprocessor 110 to provide blanking of cathode ray tube 12 during the occurrence of synchronizing signal out of range conditions.

Thus, synchronizing signal front end processor 10 operates to select the appropriate synchronizing signal inputs from computer 20 and to recover the polarity and frequency encoded information therefrom and to produce control signals which are utilized within the monitor of FIG. 1 to provide display mode and display adjustment changes and corrections for the display monitor. In addition, front end processor 10 normalizes the horizontal and vertical sync signal polarities to provide the appropriate synchronizing signals for horizontal and vertical scanning of the display system. Finally, front end processor 10 operates to automatically interrupt sync processing in the event of abnormalities in the horizontal or vertical scan synchronizing signals and when appropriate provide blanking of the cathode ray tube display.

Figure 2:
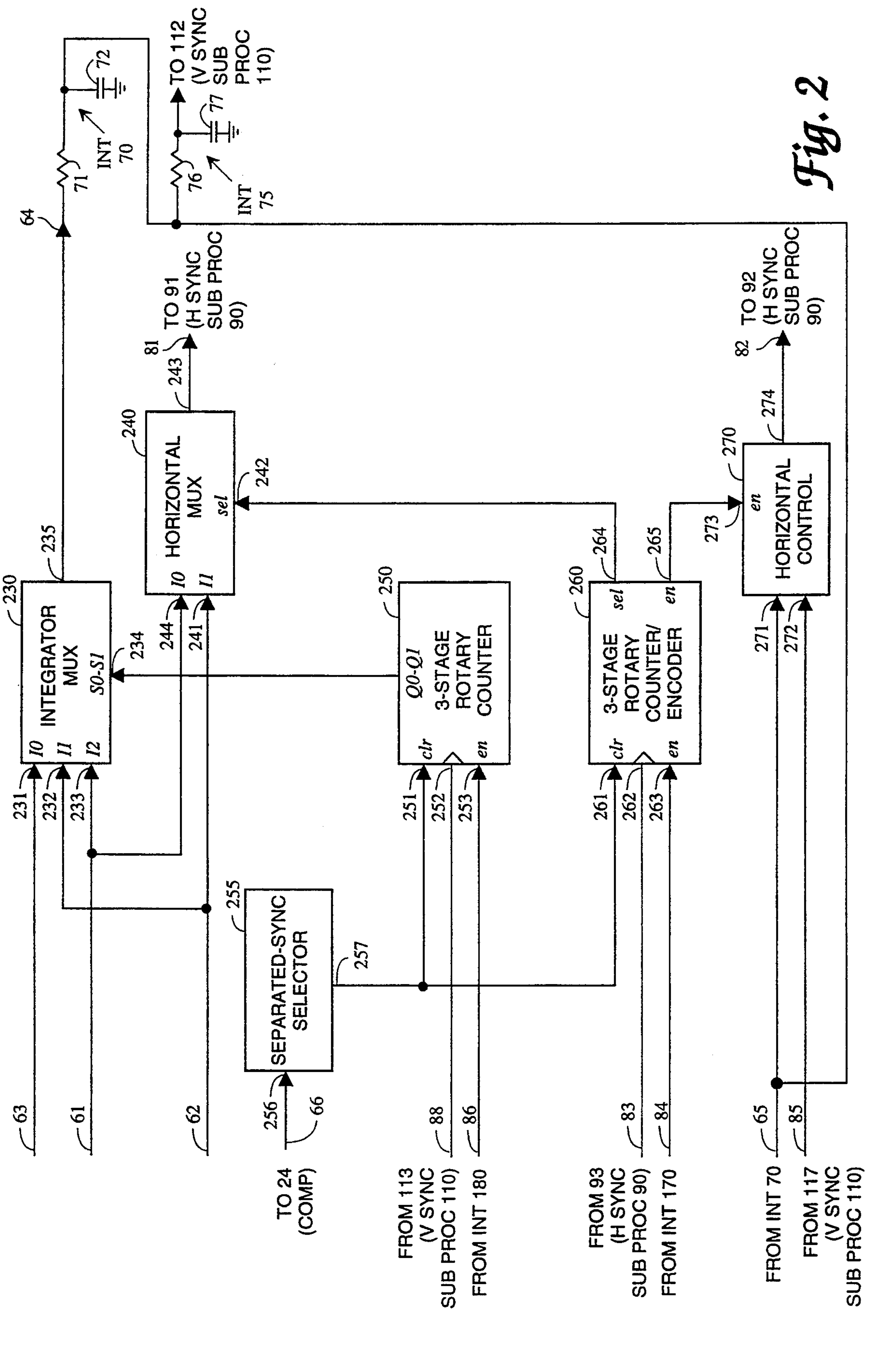
FIG. 2 sets forth a more detailed block diagram of the sync signal subprocessor of FIG. 1.

FIG. 2 sets forth a block diagram of synchronizing signal subprocessor 60. A multiplex circuit 230 includes inputs 231, 232 and 233 coupled to a vertical sync input 63, a horizontal sync input 62 and a composite sync input 61 respectively which are coupled to computer 20 as seen in FIG. 1. Multiplex circuit 230 responds to a selection input signal at select input 234 to provide a selected output signal at output 235. A horizontal multiplex circuit 240 includes a pair of inputs 244 and 241 coupled to composite sync input 61 and horizontal sync input 62 respectively. Multiplex circuit 240 further includes a selection input 242 and an output 243. The latter is coupled to input 91 of subprocessor 90 (seen in FIG. 1). Output 235 of multiplex circuit 230 is coupled to an integrator 70 formed of a series resistor 71 and a parallel capacitor 72. The output of integrator 70 is further coupled to a second integrator 75 formed of a series resistor 76 and a parallel capacitor 77. The output of integrator 75 is coupled to input 112 of subprocessor 110 (seen in FIG. 1).

A three-stage rotary counter 250 includes a clock signal input 252 coupled to output 113 of subprocessor 110 (seen in FIG. 1), an enabling signal input 253 coupled to integrator 180 (seen in FIG. 1), and a clear input 251. Counter 254 also includes a vertical sync selection output 254 which is coupled to selection input 234 of multiplex circuit 230. A three-stage rotary counter 260 includes a clock signal input 262 coupled to output 93 of subprocessor 90 (seen in FIG. 1), an enabling signal input 263 coupled to integrator 170 (also seen in FIG. 1) and a clear input 261. Counter 260 includes a horizontal sync selection signal output 264 coupled to selection input 242 of multiplex 240 and an enabling signal output 265.

A sync selector switch 255 includes an input 256 coupled to mode selection output 24 of computer 20 (seen in FIG. 1) and a mode selection output 257 coupled to inputs 251 and 261 of counters 250 and 260 respectively. A horizontal control 270 includes an integrated vertical sync input 271 coupled to the output of integrator 70, a vertical sync polarity signal input 272 coupled to output 117 of subprocessor 110 (seen in FIG. 1), and a horizontal hold signal output 274 coupled to input 92 of subprocessor 90 (seen in FIG. 1).

In operation, three-stage rotary counter 250 is initially cleared or set to a zero output state at output 254 by sync selector 255. The initial select signal applied to multiplexor 230 causes multiplexor 230 to select the vertical sync signal input at input 231 and couple it to output 235 and integrator 70. The integrated selected vertical sync signal is coupled to input 271 of horizontal control 270. In the absence of a change of sync selection signal produced by rotary counter 254, the condition of multiplex circuit 230 remains unchanged. Thus, so long as the selected vertical sync is uninterrupted and within the predetermined range of synchronizing signal frequency, the selection status of multiplexor 230 maintains the selection of vertical sync at input 231. If, however, a determination is made within vertical sync subprocessor 110 (seen in FIG. 1) that the vertical sync signal is outside the appropriate frequency range, an integrated vertical sync out of range signal is applied to enabling input 253 of counter 250. Concurrently, a vertical sync interrupt signal is produced by subprocessor 110 and applied to clock input 252. As a result, the output state of counter 250 is changed producing a corresponding change in the selection signal applied to multiplex circuit 230. In response, multiplex circuit 230 moves to the next selection state in which the composite synchronizing signal at input 233 is selected and coupled to output 235. Thereafter, the processing of the vertical synchronizing signal within vertical sync subprocessor 110 (seen in FIG. 1) is again carried forward and if the selected vertical sync is within the predetermined range, no further signals are applied to counter 250 and the selection of composite sync at input 233 remains. If, however, the selected vertical sync is again out of range, the process is repeated and counter 250 is again incremented causing multiplex circuit 230 to select the next available vertical sync input such as input 232. This process continues until an in range vertical sync signal is obtained. In addition, computer 20 (seen in FIG. 1) possesses the capability to output a mode signal which when applied to selector 255 at input 256 causes counter 250 to be cleared and forces it to a zero output state which in turn configures multiplexor 230 in a manner selecting vertical sync from input 231.

A similar three-stage rotary counter 260 is employed together with horizontal multiplex circuit 240 to provide a corresponding selection of horizontal sync signal. Thus, multiplex circuit includes a horizontal sync input 241 and a composite sync input 244 both coupled to computer 20 (seen in FIG. 1). In accordance with the selection signal applied at selection input 242, horizontal sync or composite sync is coupled to sync output 243 which in turn is coupled to horizontal sync subprocessor 90 (seen in FIG. 1). In further similarity to counter 250, counter 260 is initially configured in the zero output state which produces an output selection signal at output 264 which causes multiplex circuit 240 to select the horizontal sync signal at input 241 and couple it to subprocessor 90. By means set forth below in greater detail, subprocessor 90 determines the frequency and other characteristics of the selected horizontal sync signal. In the event the selected horizontal sync signal is found to be outside the predetermined frequency range, a horizontal sync out of range signal is produced by subprocessor 90. This out of range signal is integrated by integrator 170 to provide noise immunity and is coupled to enabling input 263 of counter 260. Concurrently, subprocessor 90 produces a horizontal interrupt signal which is coupled to clock signal input 262 of counter 260. As a result, the output state of counter 260 is incremented causing multiplex circuit 240 to switch from input 241 to input 244 coupling the composite sync signal from computer 20 to subprocessor 90.

The selection of composite synchronizing signal requires that the horizontal sync processing system be interrupted during the vertical sync interval of the composite sync signal to avoid erroneous results. Accordingly, the integrated vertical sync signal output of integrator 70 is applied to a horizontal control circuit 270. In addition, the vertical sync polarity signal produced by processor 110 (seen in FIG. 1) is also coupled to horizontal control 270. With the integrated vertical sync and vertical sync polarity signals applied, horizontal control 270 is able to detect the vertical sync interval and produce a horizontal hold signal during the vertical sync interval which interrupts the operation of subprocessor 90. To prevent undesired operation of horizontal control 270 during sync other than composite sync, an enabling signal is produced by counter 260 and applied to control 270 solely during the operational situation in which horizontal multiplex circuit 240 has selected composite synchronizing signal. Correspondingly, horizontal control 270 is inoperative in the absence of this enabling signal. Thus, so long as subprocessor 90 is receiving horizontal sync, the operation of horizontal control 270 is not enabled. Counter 260 also includes a clear input 261 which is coupled to selector 255. As a result, counter 260 is initialized or cleared by computer 20 (seen in FIG. 1) and initially configured to cause multiplex circuit 240 to select input 241.

Figure 3:
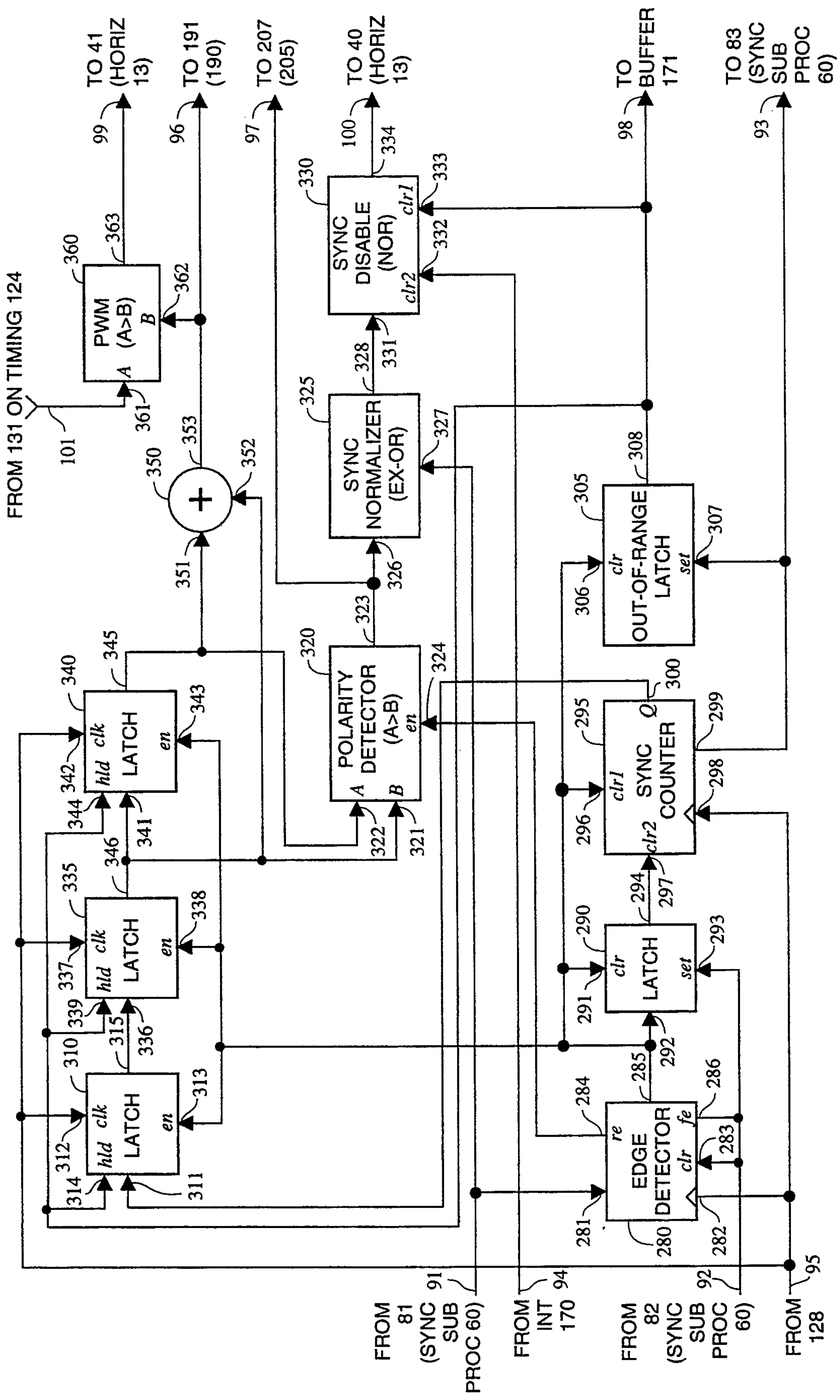
FIG. 3 sets forth a more detailed block diagram of the horizontal sync subprocessor of FIG. 1.

FIG. 3 sets forth a block diagram of horizontal sync subprocessor 90. Subprocessor 90 includes an edge detector 280 having a horizontal sync input 281 and a clear input 283 coupled to outputs 81 and 82 respectively of subprocessor 60. Edge detector 280 further includes a clock input 282 coupled to output 128 of timing subprocessor 124 (also seen in FIG. 1). Edge detector 280 includes a falling edge output 286, a rising edge output 284 and an edge output 285. A latch circuit 290 includes a clear input 291 coupled to output 285 of detector 280, an output 294, and a set input 293 coupled to clear input 283 of detector 280. A synchronous counter 295 includes a clear input 296 coupled to output 285 of detector 280, a clock input 298 coupled to clock output 128 of timing subprocessor 124, a second clear input 297 coupled to output 294 of latch 290, an overflow signal output 299 coupled to input 83 of subprocessor 60 (seen in FIG. 1) and a count output 300 coupled to input 311 of latch 310. An out of range latch circuit 305 includes a clear input 306 coupled to output 285 of edge detector 280, a set input 307 coupled to output 299 of counter 295, and an output 308 coupled to hold input 314 of latch 310.

A latch circuit 310 includes a data input 311 coupled to output 300 of counter 295, an enabling input 313 coupled to output 285 of edge detector 280, a hold signal input 314 coupled to output 308 of latch 305, a clock signal input 312 coupled to input terminal 95 of subprocessor 90, and an output 315. A latch circuit 335 includes a data input 336 coupled to output 315, a clock signal input 337 coupled to terminal 95 of subprocessor 90, a hold input 339 coupled to output 308 of latch 305, an enable input 338 coupled to output 285 of edge detector 280 and an output 346. A latch 340 includes a data input 341 coupled to output 346 of latch 335, a clock signal input 342 coupled to input 95 of subprocessor 90, an enabling input 343 coupled to output 285 of edge detector 280, a hold signal input 344 coupled to output 308 of latch 305, and an output 345. A digital adder 350 includes a pair of inputs 351 and 352 coupled to outputs 345 and 346 respectively and an output 353 coupled to input 191 of system element 190 (seen in FIG. 1). In addition, outputs 346 and 345 of latches 340 and 335 are coupled to inputs 321 and 322 respectively of a polarity detector 320. Polarity 320 includes an enabling input 324 coupled to rising edge output 284 of edge detector 280 and an output 323 coupled to input 326 of a sync normalizing circuit 325 and to input 207 of system element 205 (seen in FIG. 1).

Output 353 of adder 350 is also coupled to input 362 of a pulse width modulated circuit 360. Pulse width circuit 360 includes an input 361 coupled to output 131 of timing subprocessor 124 and an output 363 coupled to input 41 of horizontal scan system 13 (seen in FIG. 1). A sync normalizing circuit 325 includes an input 326 coupled to output 323 of polarity detector 320, an input 327 coupled to output 81 of subprocessor 60 (seen in FIG. 1) and an output 328. A synchronizing signal disabling circuit 330 includes an input 331 coupled to output 328 of normalizing circuit 325, a pair of clear inputs 332 and 333 respectively coupled to integrator 270 and buffer 171 (both seen in FIG. 1), and an output 334 coupled to horizontal scan system 13 (seen in FIG. 1).

In operation, edge detector 280 receives horizontal synchronizing signals at input 281 from subprocessor 60 (seen in FIG. 1) which may, in accordance with the above-described information use of sync signal polarity, be either positive or negative going horizontal sync signals. Edge detector 280 examines the applied sync signals and produces an output signal at output 284 each time a rising edge or low to high transition is detected. In addition, edge detector 280 produces an output signal at output 285 each time an edge of either polarity is detected. Thus, output 284 is referred to as a rising edge signal while output 285 is referred to as simply an edge signal. The edge signal at output 285 is coupled to clear input 296 of synchronous counter 295. The operation of latch circuit 290 will be set forth below in greater detail. However, suffice it to note here that under normal signal conditions latch circuit 290 is inoperative and responds solely to changes or disturbances of synchronizing signal. Thus, under normal conditions, synchronous counter 295 begins counting the horizontal clock signals applied at input 298 each time a clear input edge signal (indicative of a sync signal edge) is received at input 296. The output count of synchronous counter 295 is applied to latch circuit 310 which responds to an enabling signal in the form of an edge signal from edge detector 280. Because synchronous counter 295 begins counting upon the occurrence of each edge signal whether rising or falling edges, the applied count signals for latch 310 represents the clock signal counts which followed the most recent edge transition. Thus, each time an edge indicative signal or edge signal is applied to latch 310, the count present at input 311 of latch 310 represents the clock signal count occurring from the last previous transition or edge to the present edge. As a result, the count latched into latch 310 corresponds to the most recent interval of the horizontal scan signal applied which is alternately positive or high and negative or low.

Each edge signal from edge detector 280 also shifts the latched count in each of latches 310, 335, and 340 while clearing counter 295 and restarting its count. Because edges are detected each time the scan synchronizing signal transitions from high (more positive) to low (less positive) or from low to high, alternating high and low signal intervals are shifted through latches 310, 335 and 340.

In other words, counter 295 starts counting in response to an edge signal to begin a count period which is latched into latch 310 at the next edge signal. At the next edge signal, the new count is latched into latch 310 and its previous count is shifted to latch 335. With the next edge signal, the new count is latched into latch 310 and the previous counts of latches 310 and 335 are shifted to latches 335 and 340 respectively. As a result, the count outputs at latches 335 and 340 during each horizontal scan signal period represent the previous alternate high and low signal intervals of the scan signal. The output counts of latches 335 and 340 are applied to the inputs of polarity detector 320 which, in response to a rising edge signal, performs a comparative function and produces an output signal indicative of the relative durations of the high and low portions within the horizontal scan synchronizing signal. Thus, each time a rising edge signal enables polarity detector 320, the count stored in latch 340 represents the low signal portion of the horizontal scan synchronizing signal. Conversely, the count stored in latch 335 as polarity detector 320 is enabled corresponds to the high signal portion.

If, for example, a positive-going synchronizing signal is applied to edge detector 280, the high signal portion intervals will be substantially shorter than the low signal interval. As the counts for each high and low signal interval are successively shifted through latches 310, 335 and 340, polarity detector 320 is enabled solely in response to a rising edge signal. Since each rising edge signal coincides with the end of a low signal interval, latch 340 will always have the count for a low signal interval stored therein while latch 335 will have the high signal interval count stored.

In the example of positive going synchronizing signal, the low signal count in latch 340 will be substantially greater than the high signal count in latch 335. Polarity detector compares the output counts of latches 335 and 340 at inputs 321 and 322 respectively and interprets the greater count at input 322 as indicative of positive going synchronizing signal. In response, polarity detector produces a positive sync indication signal which is applied to sync normalizer 325.

In the event a negative going synchronizing signal is applied to edge detector 280, the converse of the above-described situation occurs resulting in a substantially greater clock signal count being stored within latch 340 and a substantially lesser count being stored in latch 335 at the time polarity detector 320 is enabled by a rising edge signal. In response to a greater count at input 321 relative to that of input 322, polarity detector 320 switches to a different logic state. Thus, the output signal from detector 320 indicates the polarity of horizontal synchronizing signal being processed.

Sync signal normalizing circuit 325 receives the horizontal scan synchronizing signal directly at input 327 and either directly couples or inverts the scan synchronizing signal in response to the output state of polarity detector 320. Thus, the polarity of synchronizing signal at the output of sync normalizer 325 is correctly configured for the remainder of the horizontal scan system regardless of the polarity used by computer 20 to provide encoded information.

The output counts of latches 335 and 340 are added by digital adder 350 to produce a combined count which represents the entire period of the horizontal scan synchronizing signal. This count signal is coupled to input 191 of subprocessor 190 (seen in FIG. 1) and to pulse width modulating circuit 360. The eight least significant bits of the frequency divider within timing subprocessor 124 form a numeric output signal which respectively decreases from its maximum value to zero as the frequency divider operates. This down-counting numeric number is applied to pulse width modulating circuit 360. Pulse width modulating circuit 360 is configured to produce a high logic state signal at output 363 so long as the down counting number applied to input 361 exceeds the total horizontal scan signal period count at input 362. Thus, each time the down counting number decreases below the horizontal scan synchronizing signal count, the output state of modulator 360 switches to a low logic state where it remains until the number count at output 131 of timing subprocessor 124 recycles to its high number and begins decreasing downwardly once again. As a result, higher frequency scan synchronizing signals are characterized by shorter periods and thereby lower count numbers at input 362 resulting in maintaining output 363 of pulse width modulator 360 at a high logic state for a greater portion of the downwardly counting or decrementing cycle of the frequency divider within timing subprocessor 124 while lower frequency scan synchronizing signals exhibit longer periods and therefore greater counts at input 362 which in turn shortens the high logic state output of pulse width modulator 360. The output signal of pulse width modulator 360, therefore, provides a voltage which varies directly with the frequency of the horizontal scan signal. This frequency indicative voltage is coupled to input 41 of horizontal scan system 13 and is used therein in accordance with conventional scan system synchronization processes. It should be noted that the use of the least significant bits of the frequency divider within timing subprocessor 124 provides a convenient source of downcounting signal. A separate down counter may, of course, be used instead.

In the event synchronous counter 295 reaches its uppermost count limit prior to the occurrence of an edge indicating signal, an overflow signal is produced at output 299 which is coupled to subprocessor 60 (seen in FIG. 1) and to out of range latch 305. The system interpretation of the overflow of synchronous counter 295 is that of a horizontal scan synchronizing signal frequency which is outside the operative range of the system. Thus, the overflow signal from counter 295 sets latch circuit 305 to produce an out of range signal which is applied to buffer 171 (seen in FIG. 1) and which operates to hold latches 310 and 340 at their last previous counts. Thus, the determination of an out of range condition is responded to by sync subprocessor 90 by maintaining the last previous stable condition until an in range horizontal scan synchronizing signal returns. It should be recalled by reference to FIGS. 1 and 2 that the out of range signal is coupled through buffer 171 and integrator 170 to input 84 of counter 260 within subprocessor 60 and results in switching the selected horizontal synchronizing signal input. Thus, the system responds to an out of range condition by searching for an in range horizontal scan synchronizing signal.

With temporary reference to FIG. 2, it should be recalled that sync subprocessor 60 is capable of selecting a composite synchronizing signal input characterized by horizontal and vertical scan synchronizing signals. It should also be recalled that horizontal control 270 within subprocessor 60 responds to the vertical scan synchronizing signal portion of a composite sync signal to produce horizontal hold or inhibit signal at output 82 of sync subprocessor 60.

Returning to FIG. 3, the horizontal hold or inhibit signal from output 82 of sync subprocessor 60 is coupled to latch 290 which in response to the hold signal produces an inhibit signal which is applied to synchronous counter 295 to terminate the operation of the counter and clear the counter output. As a result, the subprocessor 90 essentially ignores the vertical scan synchronizing portion of the composite sync signal.

Figure 4:
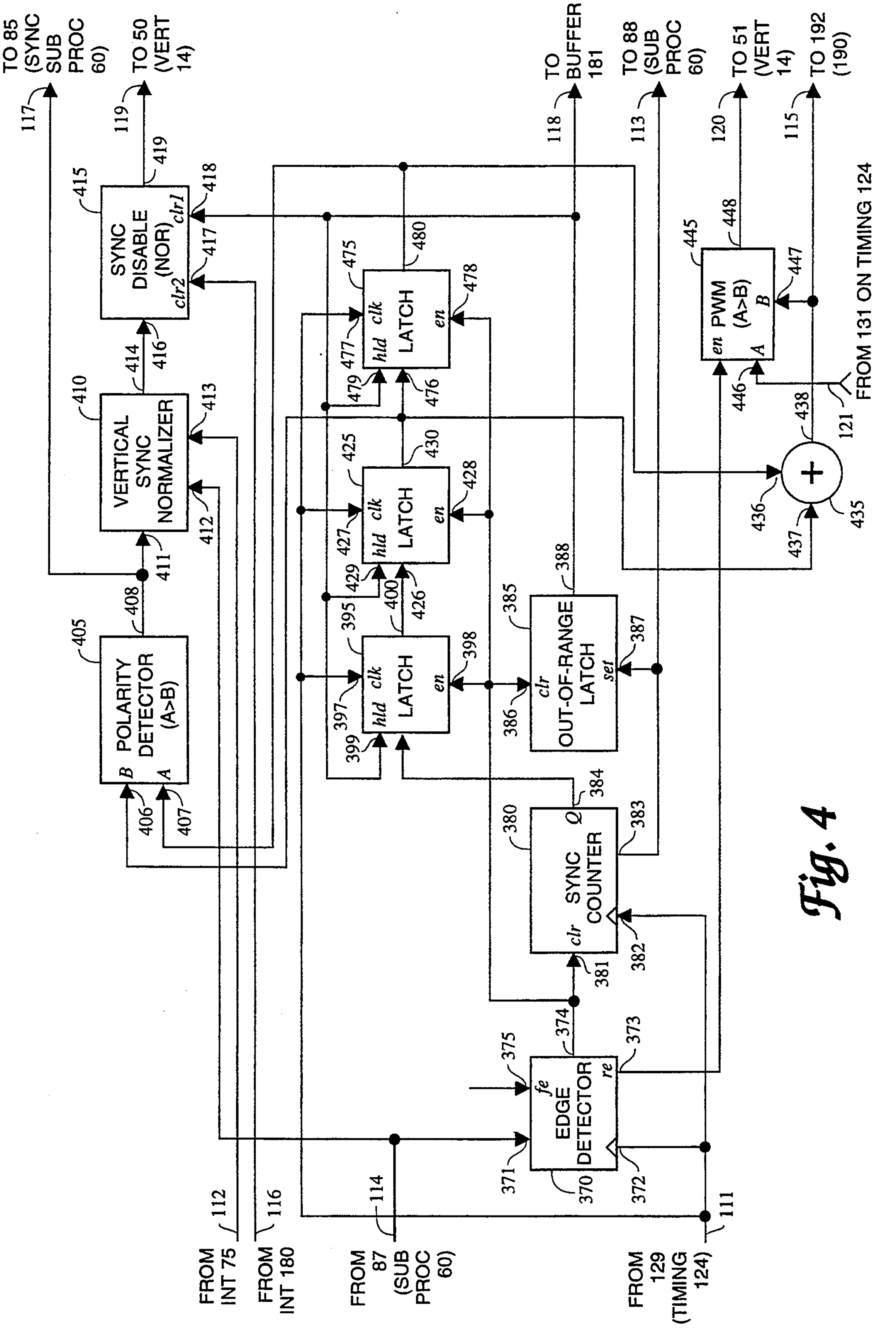
FIG. 4 sets forth a more detailed block diagram of the vertical sync subprocessor of FIG. 1.

FIG. 4 sets forth a block diagram of vertical sync subprocessor 110. Subprocessor 110 includes an edge detector 370 having a vertical sync input 371 and a clock signal input 372 coupled respectively to output 87 of subprocessor 60 and output 129 of timing circuit 126 (both seen in FIG. 1). Edge detector 370 includes an edge signal output 374, a falling edge output 375 and a rising edge input 373. A synchronous counter 380 includes a clear input 381 coupled to output 374, a clock input 382 coupled to output 129 of timing circuit 126, an overflow output 383 and a count output 384. An out of range latch 385 includes a set input 387 coupled to output 383, a clear input 386 coupled to output 374 of edge detector 370, and an output 388 coupled to buffer 181.

A latch circuit 395 includes a count input 396 coupled to output 384 of counter 380, a clock signal input 397 coupled to output 129 of timing subprocessor 124, an enable input 398 coupled to output 374 of edge detector 370, a hold signal input 399 coupled to output 388 of latch 385 and an output 400. A latch circuit 425 includes a count input 426 coupled to output 400, a clock signal input 427 coupled to output 129 of timing subprocessor 124, an enable input 428 coupled to output 374 of edge detector 370, a hold signal input 429 coupled to output 388 of latch 385, and an output 430. A latch circuit 475 includes a count input 476 coupled to output 430 of latch 425, a clock signal input 427 coupled to output 129 of timing subprocessor 124, an enable input 428 coupled to output 374 of edge detector 370, a hold signal input 429 coupled to output 388 of latch 385 and a count output 480. A polarity detector 405 includes inputs 406 and 407 coupled to outputs 430 and 480 of latches 425 and 475 respectively and an output 408. A vertical sync normalizer 410 includes an input 411 coupled to output 408 of polarity detector 405, a pair of integrated sync inputs 412 and 413 coupled respectively to output 87 of subprocessor 60 and integrator 75 (both seen in FIG. 1) and an output 414. A sync signal disabling circuit 415 includes an input 416 coupled to output 414 of normalizer 410, a pair of clear inputs 417 and 418 coupled to integrator 180 and output 388 of latch 385 respectively, and an output 419 coupled to input 50 of vertical scan system 14 (seen in FIG. 1).

A digital adder 435 includes a pair of inputs 436 and 437 coupled to outputs 480 and 430 .of latches 475 and 425 respectively and an output 438 coupled to input 192 of system element 190 (seen in FIG. 1). A pulse width modulating circuit 445 includes a pair of inputs 446 and 447 respectively coupled to terminal 131 of timing subprocessor 124 and output 438 of digital adder 435 respectively and an output 448 coupled to input 51 of vertical scan system 14.

In operation and by way of overview, it should be noted that vertical sync subprocessor 110 shown in FIG. 4 is configured and operates substantially in accordance with the configuration and the operation of horizontal sync subprocessor 90 shown in FIG. 3 with the exception of latch 290 of subprocessor 90 which is specific to subprocessor 90. Thus, subprocessor 110 is operative upon the vertical scan synchronizing signals in the same general manner as subprocessor 90 is operative upon the horizontal scan synchronizing signals and produces a corresponding set of output signals.

Specifically, edge detector 370 receives vertical scan synchronizing signals from sync subprocessor 60 (seen in FIG. 1) produces a rising edge output signal at output 373. In addition, edge detector 370 produces an edge signal at output 374 during the occurrence of either falling or rising edge transitions. The edge signal from edge detector 370 clears synchronous counter 380 causing the output count of counter 380 to be cleared and restart a new count at the occurrence of each edge signal. The output count of synchronous counter 380 is coupled to latch 395. Latch 395 is enabled by each rising edge signal of edge detector 370 to latch the new current count from synchronous counter 380 into latch 395 and shift the previous count to latch 425. Latch 425 is also enabled by the edge signal to store the output count of latch 395 and shift its previous count to latch 475. Synchronous counter 380 is reset each time an edge signal occurs due to the applied edge signal from output 374 of edge detector 370. Thus, during each cycle of the vertical scan synchronizing signal, the clock signal counts corresponding to the signal portions between each edge signal and the next successive edge signal are stored and sequentially shifted through latches 395, 425 and 475.

Polarity detector 405 is enabled each time a rising edge signal occurs and compares the output count of latch 425 to the output count of latch 475. Polarity detector 405 produces a positive polarity indicating signal when the output count of latch 475 exceeds that of latch 425 and a negative polarity indicating signal when the situation is reversed. The polarity indicating signal output of detector 405 is applied to sync subprocessor 60 (seen in FIG. 1) and to the input of sync normalizer 410. Normalizing circuit 410 responds to the applied polarity indicative signal to either directly couple or invert the vertical sync signals at inputs 412 and 413 to restore the appropriate sync signal polarity for use by the remainder of the vertical scan system (seen in FIG. 1). Sync disabling circuit 415 couples the normalized vertical scan synchronizing signal output of normalizer 410 to vertical scan system 14.

Digital adder 435 combines the output counts of latches 475 and latch 425 to produce a total output count indicative of the number of clock signals occurring within the period of the vertical scan synchronizing signal. This output count is applied to input 192 of system element 190 (seen in FIG. 1). The combined output count is also applied to one input of pulse width modulator 445. The numeric count output at output 131 of timing subprocessor 124 is also applied to pulse width modulator 445. As described above, the numeric value at output 131 counts downwardly from its maximum value to zero on a repetitive basis as the frequency division within subprocessor 124 operates. Modulator 445 is configured to produce a logic high output state at output 448 so long as the input count from timing subprocessor 124 is greater than the output counter of adder 435.

Because higher frequency scan synchronizing signals have shorter periods, they produce lower counts at input 447 of modulator 445. This in turn causes the downcounting output number of timing subprocessor 124 at input 446 to be greater than the count at input 447 for a longer interval. Conversely, lower sync signal frequencies exhibit longer periods and therefore produce greater counts at input 447 which reduce the interval during which the count at input 446 is greater. Correspondingly, output 448 of pulse width modulator 445 remains at a high logic state for longer intervals (wider pulse) during higher frequencies and shorter intervals (narrower pulse) during lower frequencies. The output signal of pulse width modulator 445 is therefore a voltage directly related to the frequency of vertical scan synchronizing signal. This frequency indicative voltage is coupled to input 51 of vertical scan system 14 and used therein for synchronizing the scanning process of the display.

In the event synchronous counter 380 exceeds it maximum count without the occurrence of an edge indicating signal, an overflow signal is produced at output 383 which sets register 385. The output signal of register 385 provides a hold signal which operates upon latches 395 and 425 to cause them to maintain or hold their last previous count. In addition, the output signal of latch 385 provides a vertical out of range signal which is coupled to buffer 181 and to sync disabling circuit 415. The out of range signal from latch 385 is integrated by integrator 180 (seen in FIG. 1) and applied to input 417 of sync disabling circuit 415. Disabling circuit 415 functions essentially in a NOR gate function and inhibits the coupling of vertical scan synchronizing signal from normalizer 410 to vertical scan system 14 in the event either of the vertical sync out of range signals are applied to inputs 417 or 418. In addition and with temporary reference to FIGS. 1 and 2, it should be recalled that the output signal of buffer 181 is integrated by integrator 180 and applied to counter 250 within subprocessor 60. As described above, counter 250 responds to the vertical sync out of range signal by selecting an alternate source of applied vertical scan synchronizing signal. This process repeats until a vertical scan synchronizing signal is found which is within the predetermined frequency range. Once an in range vertical scan synchronizing signal is again applied to subprocessor 110, the normal operation returns and synchronous counter 380 is cleared by the first detected sync signal edge.

Figure 5:
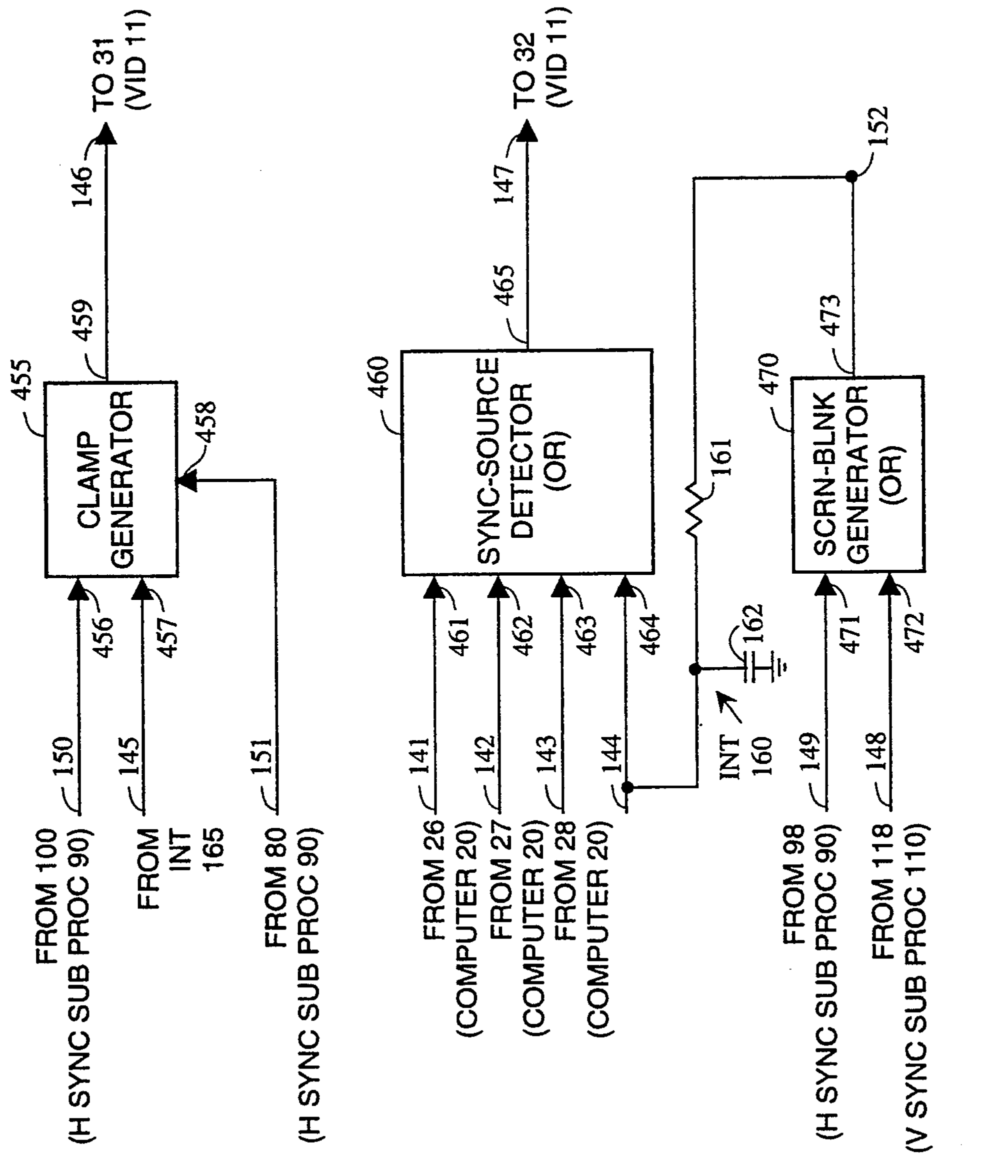
FIG. 5 sets forth a more detailed block diagram of the clamping and blanking subprocessor of FIG. 1.

FIG. 5 sets forth a block diagram of clamping and blanking subprocessor 140 (shown in FIG. 1). Subprocessor 140 includes a screen blanking generator 470 which includes a horizontal sync out of range input 471 coupled to output 98 of subprocessor 90 (seen in FIG. 1), a vertical sync out of range input 472 coupled to output 118 of subprocessor 110 (seen in FIG. 1) and a screen blanking output 473. Output 473 is coupled to an integrating network 160 formed by a series resistor 161 and a parallel capacitor 162. A sync-source detector 460 includes an integrated screen blanking input 464 coupled to integrator 165 and a blanking output 465 coupled to input 32 of video circuit 11 (seen in FIG. 1). Sync source detector 460 also includes a vertical blanking input 461, a vertical oscillator input 462, and a horizontal blanking input 463 coupled respectively to outputs 26, 27 and 28 of computer 20 (seen in FIG. 1). Subprocessor 140 further includes a clamp generator 455 having a normalized horizontal sync input 456 coupled to output 100 of subprocessor 90, an integrated normalized horizontal sync input 457 coupled to integrator 165 (seen in FIG. 1) and an output 459 coupled to input 31 of video circuit 11 (seen in FIG. 1). Clamp generator 455 also includes an input 458 coupled to output 80 of subprocessor 60 (seen in FIG. 1).

In operation, sync source detector 460 receives horizontal and vertical scan frequency blanking signals from computer 20 together with a sample of the vertical scan oscillator signal. Sync source detector 460 processes the horizontal and vertical blanking signals to produce a composite blanking signal output at output 465 which is applied to video circuit 11 (seen in FIG. 1) for further processing and application to cathode ray tube 12. Thus, sync source detector 460 may be understood to provide generally conventionally composite blanking signals for eventual application to the cathode ray tube to accomplish the image blanking function during the retrace intervals of the horizontal and vertical scan systems. In addition, screen blanking generator 470 responds to the occurrence of either a horizontal sync out of range signal or a vertical sync out of range signal to produce an additional screen blanking signal which is integrated by integrator 160 and coupled to integrated screen blanking input 464 of sync source detector 460. Thus, during the occurrence of a sync interruption or the deviation of either horizontal or vertical scan synchronizing signals from their respective predetermined frequency ranges, an additional screen blanking signal is produced by generator 470 and is processed by sync source detector 460 to provide display blanking until the appropriate vertical and horizontal scan synchronizing signals are again restored. Integrator 160 provides noise immunity for the screen blanking signal output of generator 470 and avoids image blanking during extremely short term transient conditions.

Subprocessor 140 further includes a clamp generator 455 which provides the horizontal scan rate clamping signal required by video circuit 11. Clamp generator 455 receives both normalized horizontal sync from subprocessor 90 and integrated normalized horizontal sync from integrator 165. The output clamping signal of clamp generator 455 is applied to video circuit 11 and thereafter processed in accordance with conventional techniques. In addition, clamp generator 455 receives an input signal at input 458 from subprocessor 60 (seen in FIG. 1) which indicates the selection within subprocessor 60 of composite sync, that is sync containing both horizontal and vertical scan rate synchronizing components. To avoid incorrect clamp signal generation during the processing of composite sync, clamp generator 455 inhibits clamp signal changes during the vertical sync signal component of the composite sync signal.

Figure 6:
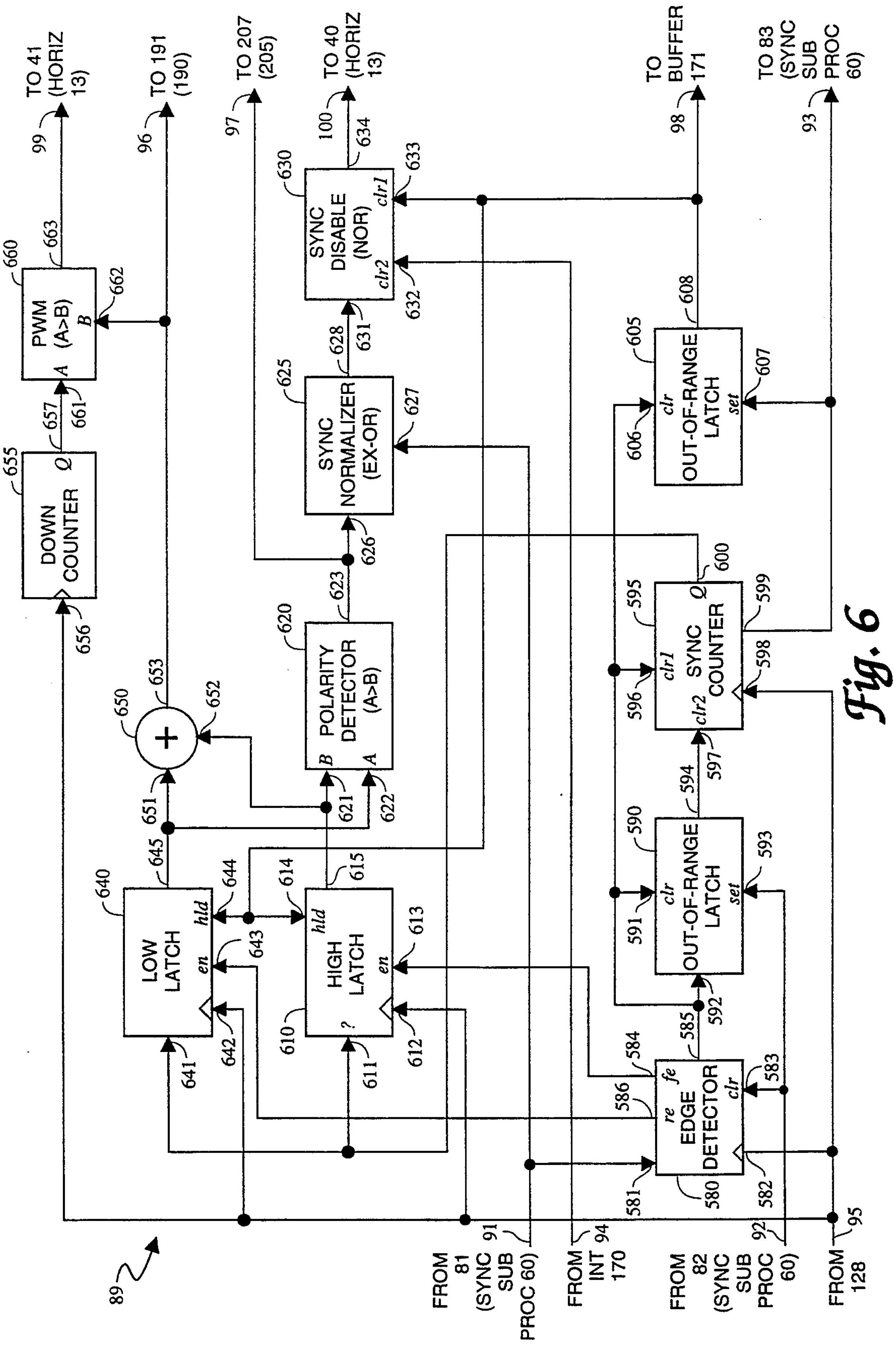
FIG. 6 sets forth a block diagram of an alternate embodiment of the horizontal sysc subprocessor.

FIG. 6 sets forth a block diagram of an alternate embodiment of horizontal sync subprocessor 90 generally referenced by numeral 89. Subprocessor 89 includes an edge detector 580 having a horizontal sync input 581 and a clear input 583 coupled to outputs 81 and 82 respectively of subprocessor 60. Edge detector 580 further includes a clock input 582 coupled to output 128 of timing subprocessor 124 (also seen in FIG. 1). Edge detector 580 includes a falling edge output 586, a rising edge output 584 and an edge output 585. A latch circuit 590 includes a clear input 591 coupled to output 585 of detector 580, an output 594, and a set input 593 coupled to clear input 583 of detector 580. A synchronous counter 295 includes a clear input 296 coupled to output 285 of detector 280, a clock input 298 coupled to clock output 128 of timing subprocessor 124, a second clear input 597 coupled to output 594 of latch 590, an overflow signal output 599 coupled to input 83 of subprocessor 60 (seen in FIG. 1) and a count output 600 coupled to inputs 611 and 641 of a pair of latches 610 and 640 respectively. An out of range latch circuit 605 includes a clear input 606 coupled to output 585 of edge detector 580, a set input 607 coupled to output 599 of counter 595, and an output 608 coupled to hold inputs 614 and 644 of latches 610 and 640 respectively.

A high signal latch circuit 610 includes a data input 611 coupled to output 600 of counter 595, an enabling input 613 coupled to output 586 of edge detector 580, a hold signal input 614 coupled to output 608 of latch 605, a clock signal input 612 coupled to input terminal 95 of subprocessor 90, and an output 615. A low signal latch 640 includes a data input 641 coupled to output 600 of counter 595, a clock signal input 642 coupled to input 95 of subprocessor 90, an enabling input 643 coupled to output 584 of edge detector 580, a hold signal input 644 coupled to output 608 of latch 605, and an output 645. A digital adder 650 includes a pair of inputs 651 and 652 coupled to outputs 645 and 615 respectively and an output 653 coupled to input 191 of system element 190 (seen in FIG. 1). In addition, outputs 615 and 645 of latches 610 and 640 are coupled to inputs 621 and 622 respectively of a polarity detector 620. Polarity 620 includes an output 623 coupled to input 626 of a sync normalizing circuit 625 and to input 207 of system element 205 (seen in FIG. 1).

Output 653 of adder 650 is also coupled to input 662 of a pulse width modulated circuit 660. A down counter 655 includes a clock signal input 656 coupled to clock input 95 of subprocessor 90, and an output 657 coupled to input 661 of pulse width circuit 660. Pulse width circuit 660 includes an output 663 coupled to input 41 of horizontal scan system 13 (seen in FIG. 1). A sync normalizing circuit 625 includes an input 626 coupled to output 623 of polarity detector 620, an input 627 coupled to output 81 of subprocessor 60 (seen in FIG. 1) and an output 628. A synchronizing signal disabling circuit 630 includes an input 631 coupled to output 628 of normalizing circuit 625, a pair of clear inputs 632 and 633 respectively coupled to integrator 270 and buffer 171 (both seen in FIG. 1), and an output 634 coupled to horizontal scan system 13 (seen in FIG. 1).

In operation, edge detector 580 receives horizontal synchronizing signals at input 581 from subprocessor 60 (seen in FIG. 1) which may, in accordance with the above-described information use of sync signal polarity, be either positive or negative going horizontal sync signals. Edge detector 580 examines the applied sync signals and produces an output signal at output 586 each time a falling edge or high to low transition is detected. Edge detector 580 also produces an output signal at output 584 each time a rising edge or low to high transition is detected in the applied synchronizing signals. Thus, output 586 is referred to as a falling edge signal while output 584 is referred to a rising edge signal. In addition, edge detector 580 produces an output signal at output 585 each time an edge of either polarity is detected. The edge signal at output 585 is coupled to clear input 596 of synchronous counter 595. The operation of latch circuit 590 will be set forth below in greater detail. However, suffice it to note here that under normal signal conditions latch circuit 590 is inoperative and responds solely to changes or disturbances of synchronizing signal. Thus, under normal conditions, synchronous counter 595 begins counting the horizontal clock signals applied at input 598 each time a clear input indicative of a sync signal edge is received at input 596. The output count of synchronous counter 595 is simultaneously applied to high circuit 610 and low latch circuit 640. High latch circuit 510 responds to an enabling signal from edge detector 580 indicative of a falling edge while low latch detector 640 responds to a rising edge indicative signal produced by edge detector 580. Because synchronous counter 595 begins counting upon the occurrence of each edge whether rising or falling, the applied count signals for latches 610 and 640 represent the clock signal counts which followed the most recent edge transition. Thus, each time a falling edge indicative signal is applied to latch 610, the count present at input 611 of latch 610 represents the clock signal count occurring from the last previous transition or edge to the detected falling edge. As a result, the count latched into latch 610 corresponds to the positive or high polarity interval of the horizontal scan signal.

Conversely, the response of latch 640 to a rising edge indicative signal, stores the clock signal count representing the portion of the applied synchronizing signal between the previous edge or transition and the current rising edge. This count therefore represents the less positive polarity or low state portion of the applied synchronizing signal.

In other words, counter 595 starts counting at each edge to begin a count period which is latched into latch 610 for the high signal portion or latch 640 for the low signal portion. As a result, the count outputs at latches 610 and 640 during each horizontal scan signal period represent the high and low signal intervals of the scan signal respectively. The output counts of latches 610 and 640 are applied to the inputs of polarity detector 620 which, in essence, performs a comparative function and produces an output signal indicative of the relative durations of the high and low portions within the horizontal scan synchronizing signal.

If, for example, the applied horizontal sync at edge detector 580 is positive going sync, synchronous counter 595 begins counting at the first rising edge of the positive going sync pulse. The output count of synchronous counter 595 increases until the falling edge of the positive going sync pulse is detected at which time an edge signal is produced which resets counter 595. Concurrently, edge detector 580 produces a falling edge indicative signal which latches the output count of counter 595 into latch 610. With the reset of synchronous counter 595, the output count again increases until the next rising edge of the positive going sync pulse is detected. The resulting edge signal from detector 580 again resets counter 595 while the rising edge indicative signal from detector 580 enables latch 640 storing the output count of counter 595. As a result, the stored count within latch 610 corresponds to the number of clock pulses occurring between each rising edge and the next occurring falling edge while the output count of latch 640 corresponds to the number of clock pulses occurring between each falling edge and the next occurring rising edge. In the example of a positive going synchronizing signal, the output count of latch 610 will be substantially less than the output count of latch 640. In response, polarity detector 620 produces a corresponding output signal indicating that the output count of latch 640 applied to input 622 is greater than the output count of latch 610 applied to input 621.

In the event a negative going synchronizing signal is applied to edge detector 580, the converse of the above-described situation occurs resulting in a substantially greater clock signal count being stored within latch 610 and a substantially lesser count being stored in latch 640. In response to a greater count at input 621 relative to that of input 622, polarity detector 620 switches to a different logic state. Thus, the output signal from detector 620 indicates the polarity of horizontal synchronizing signal being processed. Sync signal normalizing circuit 625 receives the horizontal scan synchronizing signal directly at input 627 and either directly couples or inverts the scan synchronizing signal in response to the output state of polarity detector 620. Thus, the polarity of synchronizing signal at the output of sync normalizer 625 is correctly configured for the remainder of the horizontal scan system regardless of the polarity used by computer 20 to provide encoded information.

The output counts of latches 610 and 640 are added by digital adder 650 to produce a combined count which represents the entire period of the horizontal scan synchronizing signal. This count signal is coupled to input 191 of subprocessor 190 (seen in FIG. 1) and to pulse width modulating circuit 660. Down counter 655 repetitively counts downward from a predetermined high count number in response to the applied horizontal clock signals at input 35. Thus, the output count of counter 655 is repeatedly downcounted from this predetermined high number to zero. Pulse width modulating circuit 660 is configured to produce a high logic state signal at output 663 so long as the count applied to input 661 exceeds the total horizontal scan signal period count at input 662. Thus, each time the count output of counter 655 decreases below the horizontal scan synchronizing signal count, the output state of modulator 660 switches to a low logic state where it remains until counter 655 again resets at its high number and becomes counting downwardly once again. As a result, higher frequency scan synchronizing signals are characterized by shorter periods and thereby lower count numbers at input 662 resulting in maintaining output 663 of pulse width modulator 660 at a high logic state for a greater portion of the cycle interval of counter 655 while lower frequency scan synchronizing signals exhibit longer periods and therefore greater counts at input 662 which in turn shortens the high logic state output of pulse width modulator 660. The output signal of pulse width modulator 660 therefore, provides a voltage which varies directly with the frequency of the horizontal scan signal. This frequency indicative voltage is coupled to input 41 of horizontal scan system 13 and is used therein in accordance with conventional scan system synchronization processes.

In the event synchronous counter 595 reaches its uppermost count limit prior to the occurrence of an edge indicating signal, an overflow signal is produced at output 599 which is coupled to subprocessor 60 (seen in FIG. 1) and to out of range latch 605. The system interpretation of the overflow of synchronous counter 595 is that of a horizontal scan synchronizing signal frequency which is outside the operative range of the system. Thus, the overflow signal from counter 595 sets latch circuit 605 to produce an out of range signal which is applied to buffer 171 (seen in FIG. 1) and which operates to hold latches 610 and 640 at their last previous counts. Thus, the determination of an out of range condition is responded to by sync subprocessor 90 by maintaining the last previous stable condition until an in range horizontal scan synchronizing signal returns. It should be recalled by reference to FIGS. 1 and 2 that the out of range signal is coupled through buffer 171 and integrator 170 to input 84 of counter 260 within subprocessor 60 and results in switching the selected horizontal synchronizing signal input. Thus, the system responds to an out of range condition by searching for an in range horizontal scan synchronizing signal.

With temporary reference to FIG. 2, it should be recalled that sync subprocessor 60 is capable of selecting a composite synchronizing signal input characterized by horizontal and vertical scan synchronizing signals. It should also be recalled that horizontal control 270 within subprocessor 60 responds to the vertical scan synchronizing signal portion of a composite sync signal to produce horizontal hold or inhibit signal at output 82 of sync subprocessor 60.

Returning to FIG. 6, the horizontal hold or inhibit signal from output 82 of sync subprocessor 60 is coupled to latch 590 which in response to the hold signal produces an inhibit signal which is applied to synchronous counter 595 to terminate the operation of the counter and clear the counter output. As a result, the subprocessor 89 essentially ignores the vertical scan synchronizing portion of the composite sync signal.

Figure 7:
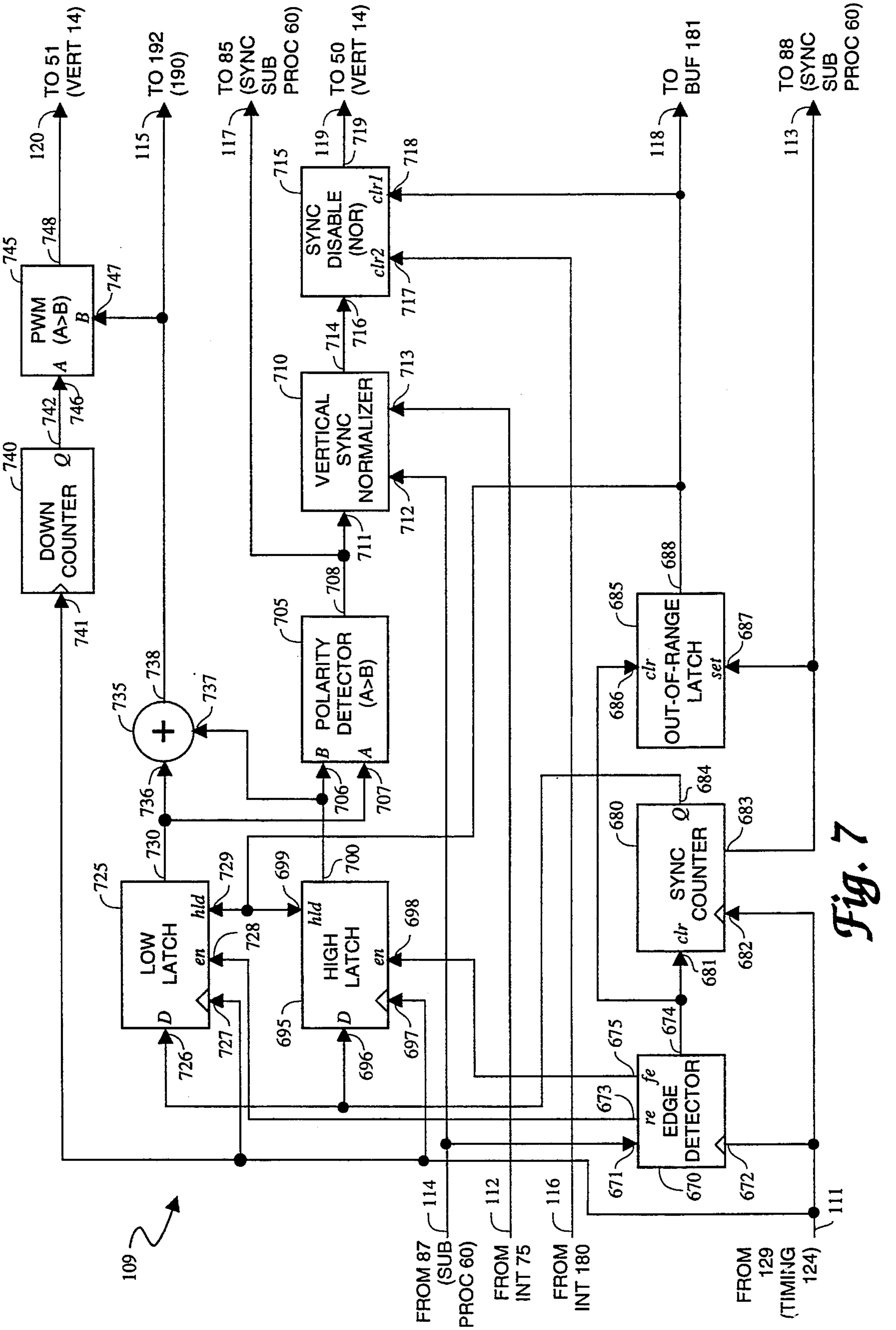
FIG. 7 sets forth a block diagram of an alternate embodiment of the vertical sync subprocessor.

FIG. 7 sets forth a block diagram of an alternate embodiment of vertical sync subprocessor 110 generally referenced by numeral 109. Subprocessor 109 includes an edge detector 670 having a vertical sync input 671 and a clock signal input 672 coupled respectively to output 87 of subprocessor 60 and output 129 of timing circuit 126 (both seen in FIG. 1). Edge detector 670 includes an edge signal output 674, a falling edge output 675 and a rising edge input 673. A synchronous counter 680 includes a clear input 681 coupled to output 674, a clock input 682 coupled to output 129 of timing circuit 126, an overflow output 683 and a count output 684. An out of range latch 685 includes a set input 687 coupled to output 683, a clear input 686 coupled to output 674 of edge detector 670, and an output 688 coupled to buffer 181.

A high signal latch 695 includes a count input 696 coupled to output 684 of counter 680, a clock signal input 697 coupled to output 129 of timing circuit 126, an enable input 698 coupled to output 675 of edge detector 670, a hold signal input 699 coupled to output 688 of latch 685 and an output 700. A low signal latch 725 includes a count input 726 coupled to output 684 of counter 680, a clock signal input 727 coupled to output 129 of timing circuit 124, an enable input 728 coupled to output 674 of edge detector 670, a hold signal input 729 coupled to output 688 of latch 685 and a count output 730. A polarity detector 705 includes inputs 706 and 707 coupled to outputs 700 and 730 of latches 695 and 725 respectively and an output 708. A vertical sync normalizer 710 includes an input 711 coupled to output 708 of polarity detector 705, a pair of integrated sync inputs 712 and 713 coupled respectively to output 87 of subprocessor 60 and integrator 75 (both seen in FIG. 1) and an output 714. A sync signal disabling circuit 715 includes an input 716 coupled to output 714 of normalizer 710, a pair of clear inputs 717 and 718 coupled to integrator 180 and output 688 of latch 685 respectively, and an output 719 coupled to input 50 of vertical scan system 14 (seen in FIG. 1).

A digital adder 735 includes a pair of inputs 736 and 737 coupled to output 730 and 700 of latches 725 and 695 respectively and an output 738 coupled to input 192 of system element 190 (seen in FIG. 1). A down counter 740 includes a clock signal input 741 coupled to output 129 of timing circuit 126 and an output 742. A pulse width modulating circuit 745 includes a pair of inputs 746 and 747 respectively coupled to output 742 of counter 740 and output 738 of digital adder 735 respectively and an output 748 coupled to input 51 of vertical scan system 14.

In operation and by way of overview, it should be noted that vertical sync subprocessor 109 shown in FIG. 7 is configured and operates substantially in accordance with the configuration and the operation of horizontal sync subprocessor 89 shown in FIG. 6 with the exception of latch 590 of subprocessor 89 which is specific to subprocessor 89. Thus, subprocessor 109 is operative upon the vertical scan synchronizing signals in the same general manner as subprocessor 89 is operative upon the horizontal scan synchronizing signals and produces a corresponding set of output signals.

Specifically, edge detector 670 receives vertical scan synchronizing signals from sync subprocessor 60 (seen in FIG. 1) and produce a falling edge indicating signal at output 675 and a rising edge output signal at output 673. In addition, edge detector 670 produces an edge signal at output 674 during the occurrence of either falling or rising edge transitions. The edge transition output signal from edge detector 670 clears synchronous counter 680 causing the output count of counter 680 to begin at the occurrence of each edge signal. The output count of synchronous counter 680 is commonly coupled to latches 695 and 725. Latch 695 is enabled by the falling edge indicative signal of edge detector 670 in response by latching the then current count from synchronous counter 680. Conversely, latch 725 is enabled by the rising edge indicating signal from edge detector 670 and stores the then current output count of synchronous counter 680. Synchronous counter 680 is reset each time either edge occurs due to the applied edge signal from output 674 of edge detector 670. Thus, during each cycle of the vertical scan synchronizing signal, the clock signal count corresponding to the signal portion between each rising edge and the next successive falling edge or high signal portion is stored within high signal latch 695 while the clock signal count corresponding to the interval between each falling edge and the next successive rising edge or low signal portion is stored within latch 725.

Polarity detector 705 compares the output count of low latch 725 to the output count of high latch 695 and produces a positive polarity indicating signal when the output count of latch 725 exceeds that of latch 695 and a negative polarity indicating signal when the situation is reversed. The polarity indicating signal output of detector 705 is applied to sync subprocessor 60 (seen in FIG. 1) and to the input of sync normalizer 710. Normalizing circuit 710 responds to the applied polarity indicative signal to either directly couple or invert the vertical sync signals at inputs 712 and 713 to restore the appropriate sync signal polarity for use by the remainder of the vertical scan system (seen in FIG. 1). Sync disabling circuit 715 couples the normalized vertical scan synchronizing signal output of normalizer 710 to vertical scan system 14.

Digital adder 735 combines the output counts of high latch 695 and low latch 725 to produce a total output count indicative of the number of clock signals occurring within the period of the vertical scan synchronizing signal. This output count is applied to input 192 of system element 190 (seen in FIG. 1). The combined output count is also applied to one input of pulse width modulator 745. Down counter 740 responds to applied clock signals and counts downwardly from a predetermined high number to zero on a repetitive basis. Modulator 745 is configured to produce a logic high output state at output 748 so long as the input count from counter 740 is greater than the output counter of adder 735.

Because higher frequency scan synchronizing signals have shorter periods, they produce lower counts at input 747 of modulator 745. This in turn causes the output count of counter 740 to be greater than the count at input 747 for a longer interval. Conversely, lower sync signal frequencies exhibit longer periods and therefore produce greater counts at input 747 which reduce the interval during which the output count of counter 740 is greater. Correspondingly, for each cycle of down counter 740, output 748 of pulse width modulator 745 remains at a high logic state for longer intervals (wider pulse) during higher frequencies and shorter intervals (narrower pulse) during lower frequencies. The output signal of pulse width modulator 745 is therefore a voltage directly related to the frequency of vertical scan synchronizing signal. This frequency indicative voltage is coupled to input 51 of vertical scan system 14 and used therein for synchronizing the scanning process of the display.

In the event synchronous counter 680 exceeds it maximum count without the occurrence of an edge indicating signal, an overflow signal is produced at output 683 which sets register 685. The output signal of register 685 provides a hold signal which operates upon latches 695 and 725 to cause them to maintain or hold their last previous count. In addition, the output signal of latch 685 provides a vertical out of range signal which is coupled to buffer 181 and to sync disabling circuit 715. The out of range signal from latch 685 is integrated by integrator 180 (seen in FIG. 1) and applied to input 717 of sync disabling circuit 715. Disabling circuit 715 functions essentially in a NOR gate function and inhibits the coupling of vertical scan synchronizing signal from normalizer 410 to vertical scan system 14 in the event either of the vertical sync out of range signals are applied to inputs 717 or 718. In addition and with temporary reference to FIGS. 1 and 2, it should be recalled that the output signal of buffer 181 is integrated by integrator 180 and applied to counter 250 within subprocessor 60. As described above, counter 250 responds to the vertical sync out of range signal by selecting an alternate source of applied vertical scan synchronizing signal. This process repeats until a vertical scan synchronizing signal is found which is within the predetermined frequency range. Once an in range vertical scan synchronizing signal is again applied to subprocessor 109, the normal operation returns and synchronous counter 680 is cleared by the first detected sync signal edge.

What has been shown is a synchronizing signal front end processor for use in a video monitor display system which facilitates the reliable communication of display mode and display adjustment information using various combinations of computer generated synchronizing signal polarities and frequencies. The system is able to accurately recover the information components while restoring the normalized appropriate scan synchronizing signals for use by the display scanning systems of the monitor. In addition, the system responds to interruptions and other abnormalities of the computer generated horizontal and vertical scan synchronizing signals to provide a stable interim operational condition for the monitor display while undertaking a search for correct or restored synchronizing signals.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a display system responsive to display scan synchronizing signals having polarity and frequency encoded information, a method of scan synchronizing signal processing comprising the steps of:
- receiving scan synchronizing signals;
- detecting edge portions within said scan synchronizing signal;
- producing a plurality of successive numeric counts representing the successive portions of said scan synchronizing signal between successive edge portions;
- comparing one of said numeric counts to its directly preceding numeric count to determine scan synchronizing signal polarity; and
- combining a successive pair of said numeric counts to determine scan synchronizing signal frequency,
- said detecting step including the steps of:
  - generating a rising edge signal each time a rising edge portion is detected; and
  - generating an edge signal each time either a rising or falling edge portion is detected.

2. The method of claim 1 wherein said step of producing a plurality of successive numeric counts includes the steps of:
- providing a periodic clock signal having a frequency substantially higher than that of said scan synchronizing signal;
- counting said clock signals;
- restarting said counting step in response to each edge signal to produce successive numeric counts; and
- storing said successive numeric counts.

3. The method of claim 2 wherein said combining step includes the step of adding a pair of successive numeric counts to produce a period count.

4. The method of claim 3 wherein said combining step further includes a step of converting said period count to a frequency indicative signal.

5. The method of claim 4 wherein said converting step includes the steps of:
- providing a downcounting clock signal having a numeric value which decreases from a predetermined start number greater than said numeric count on a repetitive basis to produce a downcounting number;
- comparing said period count to said downcounting number; and
- producing an output signal having a first condition so long as said downcounting number exceeds said period count and a second condition when it is less than said downcounting number.

6. The method of claim 1 wherein said comparing step includes timing said comparison to the occurrence of a detected rising edge.

7. For use in a display system responsive to display scan synchronizing signals having polarity and frequency encoded information, a scan synchronizing signal processor comprising:
- means for receiving scan synchronizing signals;
- means for detecting edge portions within said scan synchronizing signal;
- means for producing a plurality of successive numeric counts representing the successive portions of said scan synchronizing signal between successive edge portions;
- means for comparing one of said numeric counts to its directly preceding numeric count to determine scan synchronizing signal polarity; and
- means for combining a successive pair of said numeric counts to determine scan synchronizing signal frequency,
- said means for detecting including:
  - means for generating a rising edge signal each time a rising edge portion is detected; and
  - means for generating an edge signal each time either a rising or falling edge portion is detected.

8. A scan synchronizing signal processor as set forth in claim 7 wherein said means for producing a plurality of successive numeric counts includes:
- means for providing a periodic clock signal having a frequency substantially higher than that of said scan synchronizing signal;
- means for counting said clock signals;
- means for restarting said counting step in response to each edge signal to produce successive numeric counts; and
- means for storing said successive numeric counts.

9. A scan synchronizing signal processor as set forth in claim 8 wherein said means for combining includes: means for adding a pair of successive numeric counts to produce a period count.

10. A scan synchronizing signal processor as set forth in claim 9 wherein said means for combining further includes: means for converting said period count to a frequency indicative signal.

11. A scan synchronizing signal processor as set forth in claim 10 wherein said means for converting includes:
- means for providing a downcounting clock signal having a numeric value which decreases from a predetermined start number greater than said numeric count on a repetitive basis to produce a downcounting number;
- means for comparing said period count to said downcounting number; and
- means for producing an output signal having a first condition so long as said downcounting number exceeds said period count and a second condition when it is less than said downcounting number.

12. A scan synchronizing signal processor as set forth in claim 7 wherein said means for comparing includes means for timing said comparison to the occurrence of a detected rising edge.

13. For use in a display system responsive to display scan synchronizing signals having polarity and frequency encoded information, a method of scan synchronizing signal processing comprising the steps of:
- receiving scan synchronizing signals;
- detecting falling and rising edge portions within said scan synchronizing signal;
- producing a first numeric count representing the portion of said scan synchronizing signal between successive falling and rising edge portions;
- producing a second numeric count representing the portion of said scan synchronizing signal between successive rising and falling edge portions;
- comparing said first and second numeric counts to determine scan synchronizing signal polarity; and
- combining said first and second numeric counts to determine scan synchronizing signal frequency, said detecting step including the steps of:
- generating a rising edge signal each time a rising edge portion is detected;
- generating a falling edge signal each time a falling edge portion is detected; and
- generating an edge signal each time either a rising or falling edge portion is detected.

14. The method of claim 13 wherein said steps of producing first and second numeric counts include the steps of:
- providing a periodic clock signal having a frequency substantially higher than that of said scan synchronizing signal;
- counting said clock signals;
- restarting said counting step in response to each edge signal;
- storing the clock signal count as said first numeric count in response to said rising edge signal; and
- storing the clock signal count as said second numeric count in response to said falling edge signal.

15. The method of claim 14 wherein said combining step includes the step of adding said first and second numeric counts to produce a period count.

16. The method of claim 15 wherein said combining step further includes a step of converting said period count to a frequency indicative signal.

17. The method of claim 16 wherein said converting step includes the steps of:
- downcounting said clock signal from a predetermined start number greater than said numeric count on a repetitive basis to producing downcount numbers;
- comparing said period count to said downcount numbers; and
- producing an output signal having a first condition so long as said downcount numbers exceed said period count and a second condition when it is less than said downcount numbers.

18. For use in a display system responsive to display scan synchronizing signals having polarity and frequency encoded information, a scan synchronizing signal processor comprising:
- means for receiving scan synchronizing signals;
- means for detecting falling and rising edge portions within said scan synchronizing signal;
- means for producing a first numeric count representing the portion of said scan synchronizing signal between successive falling and rising edge portions;
- means for comparing said first and second numeric counts to determine scan synchronizing signal polarity; and
- means for combining said first and second numeric counts to determine scan synchronizing signal frequency, said means for detecting including:
- means for generating a rising edge signal each time a rising edge portion is detected;
- means for generating a falling edge signal each time a falling edge portion is detected; and
- means for generating an edge signal each time either a rising or falling edge portion is detected.

19. A scan synchronizing signal processor as set forth in claim 18 wherein said means for producing first and second numeric counts include:
- means for providing a periodic clock signal having a frequency substantially higher than that of said scan synchronizing signal;
- means for counting said clock signals;
- means for restarting said counting step in response to each edge signal;
- means for storing the clock signal count as said first numeric count in response to said rising edge signal; and
- means for storing the clock signal count as said second numeric count in response to said falling edge signal.

20. A scan synchronizing signal processor as set forth in claim 19 wherein said means for combining includes: means for adding said first and second numeric counts to produce a period count.

21. A scan synchronizing signal processor as set forth in claim 20 wherein said means for combining further includes: means for converting said period count to a frequency indicative signal.

22. A scan synchronizing signal processor as set forth in claim 21 wherein said means for converting includes:
- means for downcounting said clock signal from a predetermined start number greater than said numeric count on a repetitive basis to producing downcount numbers;
- means for comparing said period count to said downcount numbers; and
- means for producing an output signal having a first condition so long as said downcount numbers exceed said period count and a second condition when it is less than said downcount numbers.

* * * * *